(No Model.)

T. J. BARROW.
TWO-WAY SANITARY TRAP.

No. 485,833. Patented Nov. 8, 1892.

Witnesses
W. C. Coolies
John W. Adams.

Inventor
Timothy J. Barrow.
By Coburn & Thacher
Att'ys.

UNITED STATES PATENT OFFICE.

TIMOTHY J. BARROW, OF CHICAGO, ILLINOIS.

TWO-WAY SANITARY TRAP.

SPECIFICATION forming part of Letters Patent No. 485,833, dated November 8, 1892.

Application filed March 1, 1892. Serial No. 423,333. (No model.)

*To all whom it may concern:*

Be it known that I, TIMOTHY J. BARROW, a citizen of the United States, residing at Chicago, in the county of Cook and State of Illinois, have invented a certain new and useful Improvement in Two-Way Sanitary Traps, which is fully set forth in the following specification, reference being had to the accompanying drawings, in which—

Figure 1:
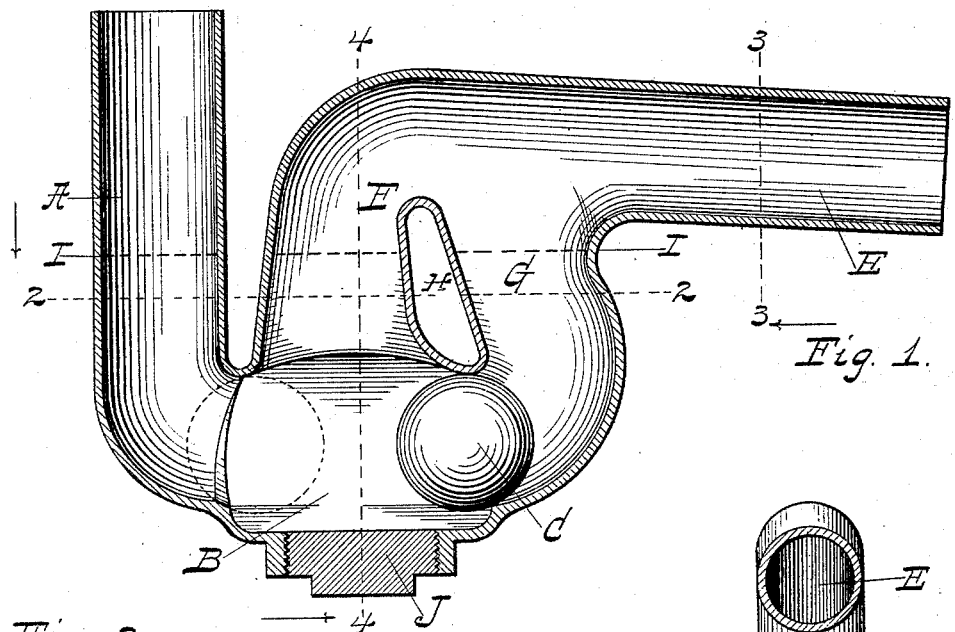
Figure 2:
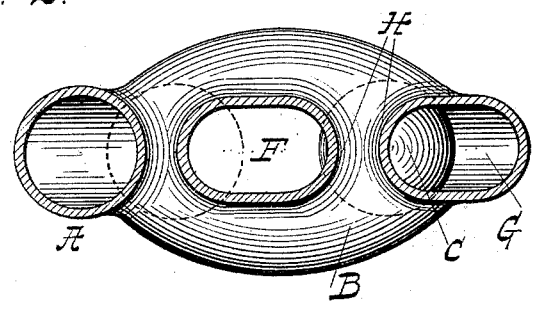
Figure 3:
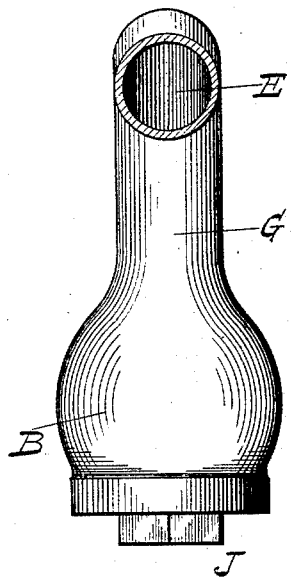
Figure 4:
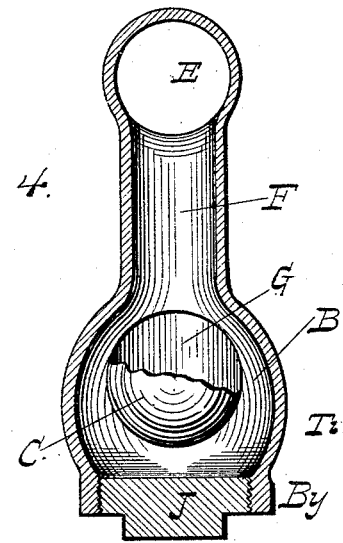

Figure 1 represents a vertical central sectional view of my trap. Fig. 2 is a horizontal sectional view taken at the line 2 2, Fig. 1. Fig. 3 is an elevation of my trap, taken at the line 3 3, Fig. 1, looking to the left. Fig. 4 is a transverse vertical sectional view taken at the line 4 4, Fig. 1, looking to the right.

My invention relates to that class of traps used in waste-pipes leading to sewers which have ball-valves.

My invention consists in providing the trap with two or more passages, so that in case there is a suction through the trap the valve will seat in one passage or way and prevent all the water from being drawn from the trap, so that when the suction or tendency to siphon the trap has subsided there will be sufficient water left in the trap to make a water seal.

My trap is so constructed that it will always retain sufficient water in it under all circumstances to make a water seal in the trap, and it also is so constructed that it is impossible for the water to set back through the trap and up through the sink or other connection of the waste-pipe.

In the accompanying drawings, A represents the waste-pipe leading from the sink or other vessel from which it is desired to have the waste water discharged.

B is the body of the trap, which contains a ball-valve C.

E is the continuation of the waste-pipe, leading from the trap to the sewer or other place for discharging the water.

F is a passage leading from the main body B of the trap to the discharge portion E of the waste-pipe, and G is also a passage leading from the main body B of the trap up to the same discharge portion E of the waste-pipe. These two passages are separated from each other by the wall H of the trap. The ball-valve C has a seat at the lower end of the passage G, as clearly shown in Fig. 4. It also has a seat at the lower end of the pipe A where it passes into the main body B of the trap. The position of the ball in this seat is indicated by dotted lines.

I indicates the normal level of the water in the trap, filling the passages F and G, as well as the body of the trap.

As the waste water flows down the pipe A the ball-valve will be forced across into the seat in the bottom of the passage G, where it is shown in full lines in Fig. 1, and the water passes out through the passage F to the pipe E. When there is a tendency to siphon the trap by means of suction through the pipe E, the water will be drawn up through the passage F till the air passes from the pipe A through the passage F into the pipe E and relieves the suction or tendency to siphon; but the ball-valve C will prevent this suction from drawing the water out of the passage G while this operation is going on. When the tendency to siphon the trap is relieved, then the ball-valve C will be forced from its seat at the lower end of the passage G and the water remaining in said passage will flow into the body of the trap and raise the water therein, so as to water-seal the pipe A. If the tendency to siphon the trap be repeated before an additional supply of water reaches it, the ball-valve C will be drawn into the seat at the lower end of the passage G, and what water is drawn up through the passage F will fall into the passage G until it is filled, and no water will pass over out through the pipe E unless there be more than sufficient water in the trap above the top of the valve-seat at the lower end of the pipe A to fill the passage G. As soon as the water is drawn out of the pipe A down to the top of the valve-seat at its lower end air will pass through, thus relieving the suction on the water, and as soon as the suction is discontinued the water stored in the passage G will flow back into the body of the trap and effect a water seal at the lower end of the pipe A. If the water flows into the trap through the pipe E, the ball-valve C immediately is forced across the body of the trap to the valve-seat in the bottom of the pipe A and the water will be prevented from passing up the pipe A. This same result will be produced should there be pressure of air or gas through the pipe E of sufficient force to force the water from the trap up the pipe A or force its way through the water to the pipe A. The passage F, while of the same capacity as the pipe A in size, is made sufficiently narrow at its lower end so that the ball-valve will not pass up into it or prevent the water from flowing through it, but will always pass across its lower end from one valve-seat to the other and prevent the water from being drawn out of the passage G by any suction or siphoning effect, and when the pressure is reversed through the trap will prevent the water or gas from being forced through the trap and up the pipe A. I have, therefore, a trap which contains a perpetual water seal and at the same time prevents water or gas from passing back through the trap, up the vertical waste-pipe, into the sink or other vessel to which the waste-pipe A leads.

J is the ordinary nut in the bottom of the pipe, which can be removed to insert the ball-valve or clean the trap of any sediment deposited therein.

I do not limit myself to the form of the trap or passages from the trap to the pipe E shown, as I may modify the form of the passages between the valve-seat at the lower end of the passage G to the pipe E; but it is essential that the valve should close the lower end of this passage or passages, so as to prevent the water from being drawn through them from the trap in case of any suction or tendency to siphon the trap, and so that when the suction is relieved the valve will open and allow the water to flow therefrom into the trap, so as to maintain a water seal at the lower end of the pipe A.

I preferably construct my trap of lead of the form, substantially as shown, and I preferably use one ball-valve that can pass from one valve-seat to the other through the trap, for the purpose above specified; but the same results would be obtained if I used a separate valve for each valve-seat.

Having thus fully described the construction and operation of my invention, what I claim as new, and desire to secure by Letters Patent, is—

1. A trap provided with two outlet-passages leading from the trap into the waste-pipe and a valve which will close one of said passages and prevent the water from being drawn out through said passage, thereby retaining sufficient water to maintain a water seal in the trap, substantially as specified.

2. The trap B, having in it two valve-seats, the down waste-pipe A, leading into the trap, the passages F and G, leading from the trap to the discharge waste-pipe E, and valve C for the purpose of always retaining water in the passage G when there is a siphoning effect through the pipe E, the water in the passage flowing back into the trap when the siphoning effect is discontinued, substantially as specified.

3. The trap A, provided with two discharge-passages F and G, the pipes E and A, a valve-seat at the lower end of the pipe A, a valve-seat at the lower end of the passage G, and the ball-valve C, the trap being so constructed that the ball-valve will pass from one valve-seat to the other and prevent the water and gas being forced up through the pipe A or being drawn through the passage G, substantially as specified.

TIMOTHY J. BARROW.

Witnesses:
ALOYSIA HELMICH,
W. C. CORLIES.